US008849208B2

(12) United States Patent
Vasenkari et al.

(10) Patent No.: US 8,849,208 B2
(45) Date of Patent: Sep. 30, 2014

(54) APPARATUS, METHOD AND RADIO SYSTEM

(75) Inventors: Petri Vasenkari, Turku (FI); Mikko Pesola, Marynummi (FI)

(73) Assignee: Nokia Corporation, Espoo (FI)

( * ) Notice: Subject to any disclaimer, the term of this patent is extended or adjusted under 35 U.S.C. 154(b) by 565 days.

(21) Appl. No.: 12/558,996

(22) Filed: Sep. 14, 2009

(65) Prior Publication Data
US 2010/0144279 A1 Jun. 10, 2010

(30) Foreign Application Priority Data

Dec. 5, 2008 (FI) ..................... 20086169

(51) Int. Cl.
*H04B 1/00* (2006.01)
*H04B 15/02* (2006.01)
*G01S 19/21* (2010.01)
*H04B 1/38* (2006.01)
(52) U.S. Cl.
CPC .............. *H04B 1/3805* (2013.01); *H04B 15/02* (2013.01); *G01S 19/21* (2013.01); *H04B 2215/068* (2013.01)

USPC ...... 455/63.1; 455/114.2; 455/296; 455/3.02; 455/427; 455/98

(58) Field of Classification Search
CPC .................................................. H04W 28/048
USPC .............. 455/63.1, 114.2, 296, 3.02, 427, 98
See application file for complete search history.

(56) References Cited

U.S. PATENT DOCUMENTS

| 7,634,234 | B2 * | 12/2009 | Karabinis ................. | 455/67.11 |
| 7,933,552 | B2 * | 4/2011 | Karabinis et al. ............ | 455/12.1 |
| 2008/0139168 | A1 * | 6/2008 | Islam et al. ............... | 455/404.1 |
| 2010/0035562 | A1 * | 2/2010 | Alberth et al. .................. | 455/75 |
| 2010/0041347 | A1 * | 2/2010 | Prise .............................. | 455/77 |

* cited by examiner

*Primary Examiner* — Wen Huang
(74) *Attorney, Agent, or Firm* — Squire Patton Boggs (US) LLP (57) ABSTRACT

An apparatus is provided to include a detector. The detector can detect that an interfering communications connection to a received satellite system signal in a mobile terminal is to be established by the mobile terminal. The apparatus include a processor that can prevent interference to the received satellite system signal due to the interfering communications connection by controlling uplink resource allocation of the mobile terminal based on the detection.

20 Claims, 5 Drawing Sheets

APPARATUS, METHOD AND RADIO SYSTEM

FIELD OF THE INVENTION

The present invention relates to a method, an apparatus, a radio system, and an article of manufacture comprising a computer readable medium.

BACKGROUND ART

The global satellite navigation systems, such as GPS and Galileo, may both use L1 frequency band at 1.575 GHz. In certain cases, the transmissions from a mobile transmitter in the vicinity of a GPS receiver may cause interference to the GPS receiver and prevent the GPS receiver from making location determinations.

Further, for example in case of making emergency calls, the location of a mobile terminal is obtained while the emergency call is proceeding. However, in certain situations, the mobile terminal may not be able to acquire its GPS location. Thus, advanced solutions are needed in order to prevent mobile terminal transmissions from interfering with GPS reception.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, an apparatus, a radio system, and an article of manufacture comprising a computer readable medium as defined in the independent claims. Further embodiments of the invention are disclosed in the dependent claims.

An aspect of the invention relates to a method comprising: detecting, by an apparatus, that an interfering communications connection to a received satellite system signal in a mobile terminal is to be established by the mobile terminal; and preventing interference to the received satellite system signal due to the interfering communications connection by controlling uplink resource allocation of the mobile terminal on the basis of the detection.

A further aspect of the invention relates to an apparatus comprising: a detection device configured to detect that an interfering communications connection to a received satellite system signal in a mobile terminal is to be established by the mobile terminal; and a processor configured to prevent interference to the received satellite system signal due to the interfering communications connection by controlling uplink resource allocation of the mobile terminal on the basis of the detection.

A still further aspect of the invention relates to a radio system comprising: one or more network elements, at least one mobile terminal communicating with the one or more network elements, wherein a network element is configured to detect that an interfering communications connection to a received satellite system signal in the mobile terminal is to be established by the mobile terminal; and to prevent interference to the received satellite system signal due to the interfering communications connection by controlling uplink resource allocation of the mobile terminal on the basis of the detection.

A further aspect of the invention relates to an article of manufacture comprising a computer readable medium and embodying program instructions thereon executable by a computer operably coupled to a memory which, when executed by the computer, carry out the functions of: detecting that an interfering communications connection to a received satellite system signal in a mobile terminal is to be established by the mobile terminal; and preventing interference to the received satellite system signal due to the interfering communications connection by controlling uplink resource allocation of the mobile terminal on the basis of the detection.

According to an embodiment of the invention, the apparatus is configured to detect that the reception of the satellite system signal is established by the mobile terminal on the basis of a global satellite navigation system information request received from the mobile terminal.

According to a further embodiment of the invention, the apparatus is configured to detect that the interfering communications connection to the received satellite system signal is to be established by the mobile terminal during the reception of the satellite system signal in the mobile terminal.

According to a further embodiment of the invention, the apparatus is configured to receive a connection request from the mobile terminal; and to detect that the connection requested by the mobile terminal is such that simultaneous reception of the satellite system signal is expected during the established connection.

According to a further embodiment of the invention, the requested connection is an emergency call connection.

According to a further embodiment of the invention, the apparatus is configured to detect that the connection requested by the mobile terminal is an interfering communications connection to the received satellite system signal.

According to a further embodiment of the invention, the interference to the satellite system signal due to the interfering communications connection is prevented by controlling uplink transmission bandwidth for the mobile terminal.

According to a further embodiment of the invention, the interference to the satellite system signal due to the interfering communications connection is prevented by scheduling uplink transmission bandwidth for the mobile terminal such that the reception of the satellite system signal is ensured.

According to a further embodiment of the invention, the interference to the satellite system signal due to the interfering communications connection is prevented by scheduling uplink transmission bandwidth for the mobile terminal to lower or to higher frequency part of the bandwidth.

According to a further embodiment of the invention, the interference to the satellite system signal due to the interfering communications connection is prevented by avoiding scheduling uplink transmission bandwidth for mobile terminal to higher or to lower frequency part of the band.

According to a further embodiment of the invention, the satellite system signal is a global positioning system signal for determining location of the mobile terminal.

A further aspect of the invention is a network element which is configured to perform functionality according to any embodiment of the invention.

An aspect of the invention is a program containing an executable code configured to perform a method according to any embodiment of the invention when executed in a computing device.

An aspect of the invention is an article of manufacture comprising a computer readable medium and embodying program instructions thereon executable by a computer operably coupled to a memory which, when executed by the computer, carry out the functions of: detecting that an interfering communications connection to a received satellite system signal in a mobile terminal is to be established by the mobile terminal; and preventing interference to the received satellite system signal due to the interfering communications connection by controlling uplink resource allocation of the mobile terminal on the basis of the detection.

An aspect of the invention is a computer readable medium including at least one of the following media: a computer readable medium, a program storage medium, a record medium, a computer readable memory, a computer readable software distribution package, a computer readable signal, a computer readable telecommunication signal, and a computer readable compressed software package.

An aspect of the invention is an apparatus comprising: detection means for detecting that an interfering communications connection to a received satellite system signal in a mobile terminal is to be established by the mobile terminal; and processing means for preventing interference to the received satellite system signal due to the interfering communications connection by controlling uplink resource allocation of the mobile terminal on the basis of the detection.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems. The communication system may be a fixed communication system or a mobile communication system or a communication system utilizing both fixed networks and mobile networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE/SAE (Long Term Evolution/System Architecture Evolution) network elements without restricting the embodiment to such architecture, however.

Figure 1:
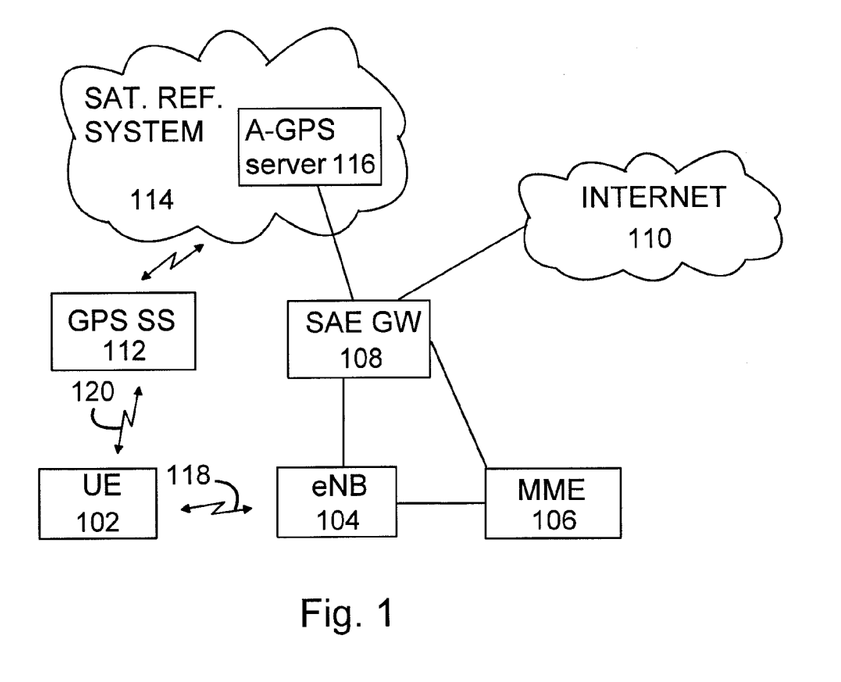
FIG. 1 shows a simplified block diagram illustrating exemplary system architecture.

With reference to FIG. 1, let us examine an example of a radio system to which embodiments of the invention can be applied. In this example, the radio system is based on LTE/SAE (Long Term Evolution/System Architecture Evolution) network elements. However, the invention described in these examples is not limited to the LTE/SAE radio systems but can also be implemented in other radio systems, such as WIMAX (Worldwide Interoperability for Microwave Access), or in other suitable radio systems.

A general architecture of a radio system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication are irrelevant to the actual invention. Therefore, they need not be discussed in more detail here.

The exemplary radio system of FIG. 1 comprises a service core of an operator including the following elements: an MME (Mobility Management Entity) 106 and an SAE GW (SAE Gateway) 108.

Base stations that may also be called eNBs (Enhanced node Bs) 104 of the radio system host the functions for Radio Resource Management: Radio Bearer Control, Radio Admission Control, Connection Mobility Control, Dynamic Resource Allocation (scheduling). The MME 106 is responsible for distributing paging messages to the eNBs 104.

The user equipment 102 which may also be called mobile terminals may communicate with the base station 104 using signals 118. The signals 112 between the mobile terminal 102 and the base station 104 carry digitized information, which is e.g. traffic data or control data.

The calls/services may be "long distance" where user traffic passes via the SAE GW 108. For example, a connection from the mobile terminal 102 to an external IP networks, such as to the Internet 110, may be guided via the SAE GW 108. However, also local calls/services are possible in the exemplary radio system.

Each base station 104 of the radio system broadcast a signal 118 that may be a pilot signal such that the mobile terminal 102 can observe a potential base station to serve the mobile terminal 102. Based on the pilot signals, the mobile terminal selects a base station with which to start a communication when switched on or to which to perform a handoff during a normal operation.

Different global satellite navigation systems provide geospatial positioning with global coverage. Such systems enable small electronic receivers, such as the mobile terminal 104, to determine their location (longitude, latitude and altitude) to within a few meters by using time signals transmitted along a line of sight by a radio from satellites. Examples of current global navigation systems include, for example, a GPS (Global Positioning System) and GLONASS (Global Navigation Satellite System). Other near-future systems include Compass navigation system, DORIS (Doppler Orbitography and Radio-positioning Integrated by Satellite), Galileo Positioning System, IRNSS (Indian Regional Navigational Satellite System), and QZSS (Quasi-Zenith Satellite System).

As an example, the GPS system is described as the global satellite navigation system of FIG. 1. However, any other suitable satellite system may be used instead of the GPS system. The GPS system consists of a GPS space segment 112 comprising orbiting GPS satellites. The tracking information of flight paths of the satellites is tracked by a satellite reference system 114 on earth. The GPS satellites broadcast at the same two frequencies, 1.57542 GHz and 1.2276 GHz. The GPS enabled mobile terminals 102 may receive GPS satellite broadcasts directly from the satellites via a connection 120.

Since the conventional GPS may have difficulty providing reliable positions in poor signal conditions, an assisted GPS (A-GPS) may be used to enhance the performance of the navigation system. In the example of FIG. 1, let us assume that the mobile terminal 102 is an A-GPS capable receiver. Thus, an assistance server 116 is used to locate the mobile terminal 102 roughly by which cell site it is connected to in the radio system. The assistance server 116 sends A-GPS information, such as information on the mobile terminal's initial position and orbital data for the GPS satellites, to the mobile terminal 102 in order to enable the location of the mobile terminal 102 to be calculated.

Figure 2:
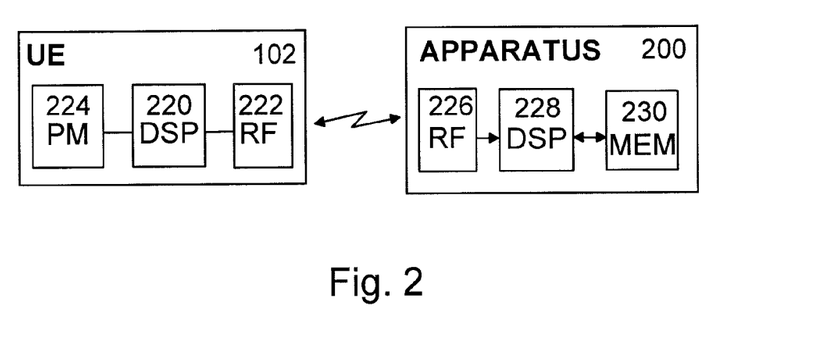
FIG. 2 shows a simplified block diagram illustrating an example of a mobile terminal and an apparatus.

FIG. 2 is a block diagram of a mobile terminal 102 and an apparatus 200 according to an embodiment of the invention. Although the apparatus 200 has been depicted as one entity, different modules and memory may be implemented in one or more physical or logical entities. The apparatus 200 is configured to detect that an interfering communications connection to a received satellite system signal in the mobile terminal 102 is to be established by the mobile terminal; and to prevent interference to the received satellite system signal due to the interfering communications connection by controlling uplink resource allocation of the mobile terminal on the basis of the detection. For this purpose, the apparatus 200 comprises a memory 230 for storing control information at least temporarily, a processor 228, and a communication unit 226 for sending and receiving different outputs, information and messages. The apparatus 200 further comprises a detection device (e.g. as a part of the processor 228 and/or the memory 230) configured to detect that an interfering communications connection to a received satellite system signal in the mobile terminal 102 is to be established by the mobile terminal. The processor 228 is then configured to prevent interference to the received satellite system signal due to the interfering communications connection by controlling uplink resource allocation of the mobile terminal on the basis of the detection.

The mobile terminal 102 comprises a communication unit 222 configured to communicate with the apparatus 200 that may be a part of one or more base stations of a public mobile network, and a processing unit 220 for controlling the functions of the mobile terminal. The mobile terminal 102 may also be a user terminal which is a piece of equipment or a device that associates, or is arranged to associate, the user terminal and its user with a subscription and allows the user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone. The processing unit 220 is typically implemented with a microprocessor, a signal processor or separate components and associated software. The mobile terminal 102 further comprises an A-GPS positioning module 224 for calculating position/location data of the mobile terminal. The A-GPS positioning module 224 may comprise a GPS receiver configured to receive GPS signals from the system of satellites 112 and GPS assistance information from the A-GPS server 116 via the apparatus 200.

The functionality of the processor 228 is described in more detail below with FIGS. 5 and 6. It should be appreciated that the apparatus may also comprise other different units. However, they are irrelevant to the actual invention and, therefore, they need not be discussed in more detail here.

The apparatus 200 may be any network node or a host which is able to provide the necessary functionality of at least some of the embodiments. The apparatus 200 may be a network entity of a radio system, such as an entity that is a part of a base station. It is also possible that the different modules of the apparatus reside in different network entities of the system.

The apparatus 200 may generally include a processor 228, controller, control unit or the like connected to a memory and to various interfaces of the apparatus. Generally the processor 228 is a central processing unit, but the processor may be an additional operation processor. The processor may comprise a computer processor, application-specific integrated circuit (ASIC), field-programmable gate array (FPGA), and/or other hardware components that have been programmed to carry out one or more functions of an embodiment.

The memory 230 may include volatile and/or non-volatile memory and typically stores content, data, or the like. For example, the memory 230 may store computer program code such as software applications (for example for the detection device) or operating systems, information, data, content, or the like for the processor to perform steps associated with the operation of the apparatus in accordance with embodiments. In the illustrated embodiment, the memory 230 stores instructions on how to detect that an interfering communications connection to a received satellite system signal in a mobile terminal is to be established by the mobile terminal, and how to prevent interference by controlling uplink resource allocation. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding network entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer, or external to the processor/computer, in which case it can be communicatively coupled to the processor/computer via various means, as is known in the art.

The memory 230 is configured to store programming, such as executable code or instructions (e.g. software or firmware), electronic data, databases, or other digital information, and it may include processor-usable media. Processor-usable media may be embodied in any computer program product or article of manufacture which can contain, store, or maintain programming, data or digital information for use by or in connection with an instruction execution system including processor 228 in the exemplary embodiment. For example, exemplary processor-usable media may include any one of physical media, such as electronic, magnetic, optical, electromagnetic, infrared or semiconductor media. Some more specific examples of processor-usable media include, but are not limited to, a portable magnetic computer diskette, such as a floppy diskette, zip disk, hard drive, random-access memory, read only memory, flash memory, cache memory, or other configurations capable of storing programming, data, or other digital information.

At least some embodiments or aspects described herein may be implemented using programming stored within an appropriate memory 230 described above, or communicated via a network or other transmission media and configured to control an appropriate processor 228. For example, programming may be provided via appropriate media including, for example, embodied within articles of manufacture, embodied within a data signal (e.g. modulated carrier wave, data packets, digital representations etc.) communicated via an appropriate transmission medium, such as a communication network (e.g. the Internet or a private network), wired electrical connection, optical connection or electromagnetic energy, for example, via communications interface, or it may be provided using another appropriate communication structure or medium. Exemplary programming including processor-usable code may be communicated as a data signal embodied in a carrier wave in but one example.

In an embodiment, the detection device 200 is configured to detect that the reception of the satellite system signal is established by the mobile terminal 102 on the basis of a global satellite navigation system information request received from the mobile terminal.

In an embodiment, the detection device is further configured to detect that the interfering communications connection to the received satellite system signal is to be established by the mobile terminal during the reception of the satellite system signal in the mobile terminal.

In an embodiment, the communications device 226 is configured to receive a connection request from the mobile terminal; and the detection device is further configured to detect that the connection requested by the mobile terminal is such that simultaneous reception of the satellite system signal is expected during the established connection.

In an embodiment, the requested connection is an emergency call connection.

In an embodiment, the detection device is further configured to detect that the connection requested by the mobile terminal is an interfering communications connection to the received satellite system signal.

In an embodiment, the processor is further configured to control uplink transmission bandwidth for the mobile terminal in order to prevent interference to the satellite system signal due to the interfering communications connection.

In an embodiment, the processor is further configured to schedule uplink transmission bandwidth for the mobile terminal such that the reception of the satellite system signal is ensured in order to prevent interference to the satellite system signal due to the interfering communications connection.

In an embodiment, the processor is further configured to schedule uplink transmission bandwidth for the mobile terminal to lower or higher frequency part of the bandwidth in order to prevent interference to the satellite system signal due to the interfering communications connection.

In an embodiment, the processor is further configured to avoid scheduling uplink transmission bandwidth for the mobile terminal to higher or lower frequency part of the band in order to prevent interference to the satellite system signal due to the interfering communications connection.

Figure 3A:
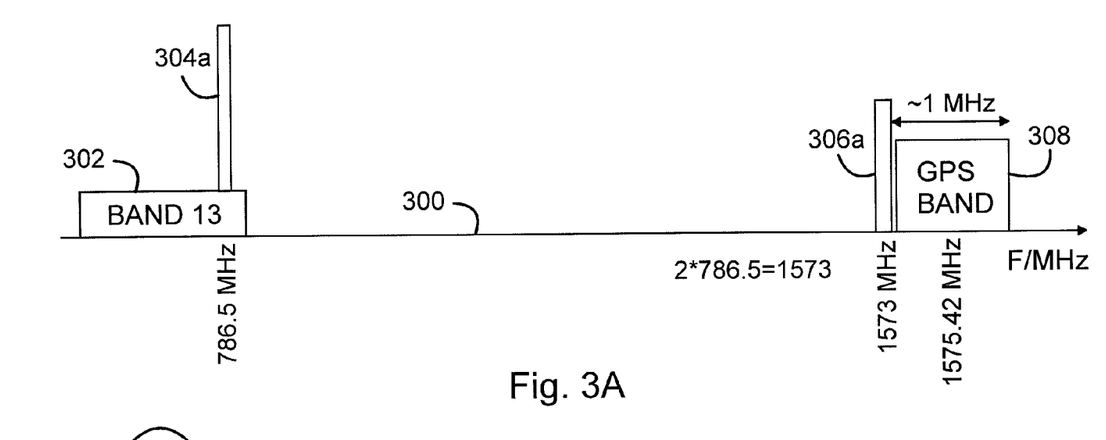
FIG. 3A shows an exemplary drawing of uplink transmission configuration.
Figure 3B:
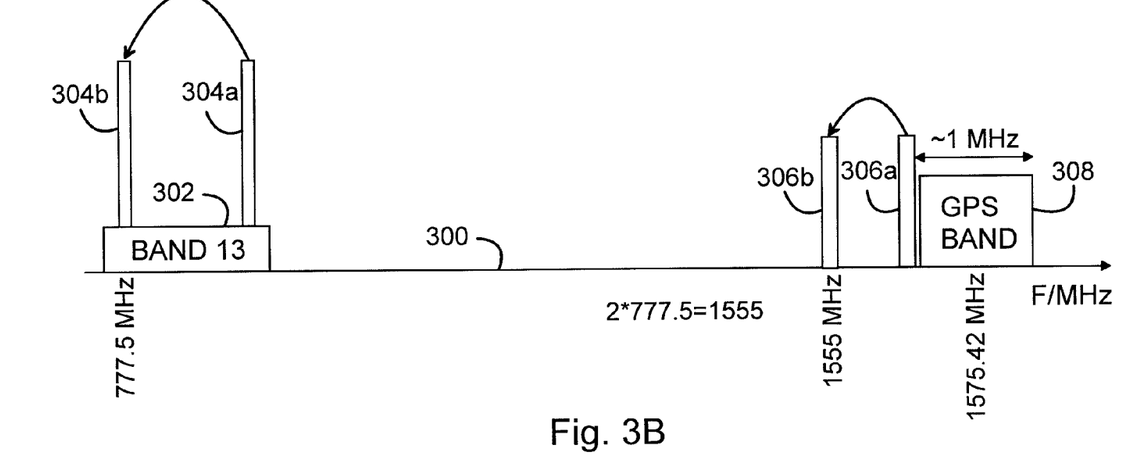
FIG. 3B shows an exemplary drawing of uplink transmission configuration according to an embodiment of the invention.

FIGS. 3A and 3B show exemplary drawings of uplink transmission configurations. As an example, an LTE radio system with a frequency band 13 (302) and a GPS band 308 are described here. However, other radio systems, such as WiMAX, may also be used to implement different embodiments. An LTE signal consists of resource blocks, each having a bandwidth of 180 kHz. A mobile terminal may send a minimum of 1 resource block and a maximum of as many resource blocks as fits to a given channel bandwidth. In case of band 13, the channel bandwidth is 10 MHz, i.e. 50 resource blocks. A base station may decide how many resource blocks a mobile terminal can transmit in a given time and in which part of the channel.

In certain situations, such is possible that a mobile terminal transmitter near a GPS receiver may prevent the GPS receiver from making location updates. For example, in the case of LTE band 13, the GPS co-existence problem exists when the transmitted resource block frequency is almost exactly half of the GPS frequency. For example, GPS and Galileo systems use the frequency band 300 at 1 575.42 MHz. In the case of band 13, the worst case scenario is when a mobile terminal is scheduled to transmit one resource block at a centre frequency of 786.41 MHz (BW 180 kHz). Thus, the $2^{nd}$ harmonic centre frequency will be 2*786.41=1 572.82 MHz (BW 360 kHz). The edge of this spurious signal is 1 572.82+0.18=1 573 MHz.

FIG. 3A shows an example of a band 13 situation where the base station has allocated the mobile terminal uplink resource block in a high frequency part 304a of the band 13 (302). Then the $2^{nd}$ harmonic of the LTE transmission signal 306a hits next to the GPS band 308, thus causing the GPS reception to be blocked.

FIG. 3B shows an exemplary drawing of uplink transmission configuration according to an embodiment. When a network element, e.g. in a base station, has detected that an interfering communications connection to a received global satellite navigation system signal in a mobile terminal is to be established, e.g. a mobile terminal requests A-GPS information or requests an emergency call connection, the network element schedules the mobile terminal to transmit in the lower frequency part of the band 13 (302). In this example, the allocation of the uplink resource block is assigned from the higher frequency part of the band 304a to the lower frequency part 304b of the band. Thus, the $2^{nd}$ harmonic of the LTE signal moves about 18 MHz away from the GPS band, from 306a to 306b. Since the centre frequency of the $2^{nd}$ harmonic of the LTE signal will now be about 1 555 MHz, it does not block the GPS reception any more.

Figure 4A:
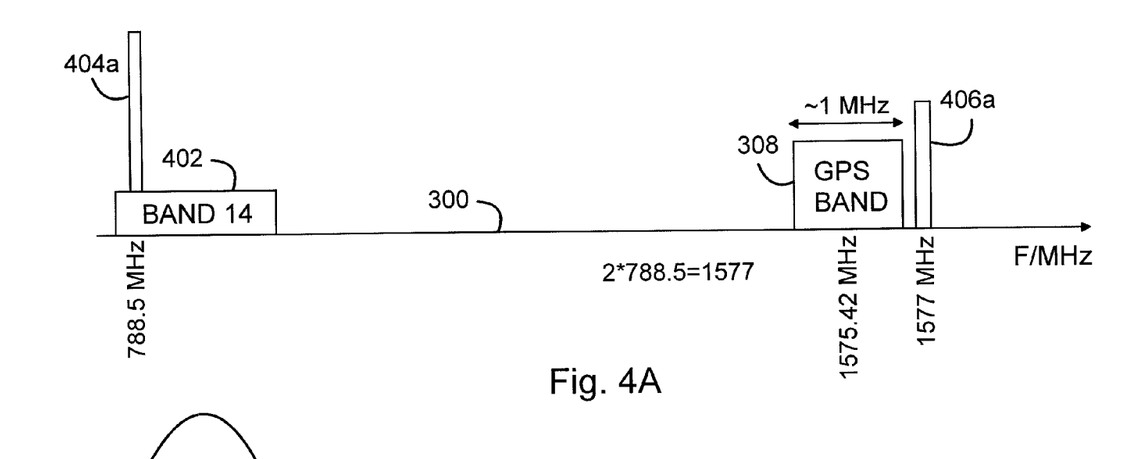
FIG. 4A shows an exemplary drawing of uplink transmission configuration.

FIG. 4A shows an example of a band 14 situation where the base station has allocated mobile terminal uplink resource block in the lower frequency part 404a of the band 14 (402). Then the $2^{nd}$ harmonic of the LTE transmission signal 406a again hits next to the GPS band 308 at the centre frequency of 1 577 MHz, thus causing the GPS reception to be blocked. In the case of the LTE band 14, the worst case scenario is when the mobile terminal is scheduled to transmit one resource block at centre frequency of 788.59 MHz (BW 180 kHz). Thus, the $2^{nd}$ harmonic centre frequency will be 2*786.41=1 577.18 MHz (BW 360 kHz). The edge of this spurious signal is 1 577.18−0.18=1 577 MHz.

Figure 4B:
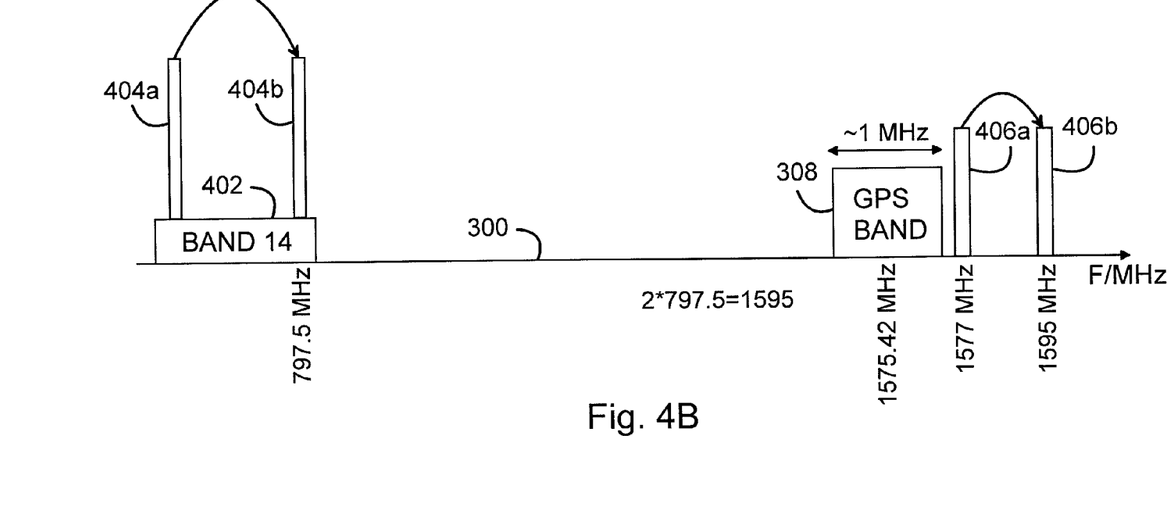
FIG. 4B shows an exemplary drawing of uplink transmission configuration according to an embodiment of the invention.

FIG. 4B shows an exemplary drawing of uplink transmission configuration according to an embodiment. When the network element has detected that an interfering communications connection to a received global satellite navigation system signal in a mobile terminal is to be established, e.g. a mobile terminal requests A-GPS information or requests an emergency call connection, the network element may decide to schedule the mobile terminal to transmit in the higher frequency part of the band 14 (402). In this example, the allocation of the uplink resource block is assigned from the lower frequency part of the band 404a to the higher frequency part 404b of the band. Thus, the $2^{nd}$ harmonic of the LTE signal moves about 18 MHz away from the GPS band 308, from 406a to 406b. Since the centre frequency of the $2^{nd}$ harmonic of the LTE signal will now be about 1 595 MHz, it does not block the GPS reception any more.

Figure 5:
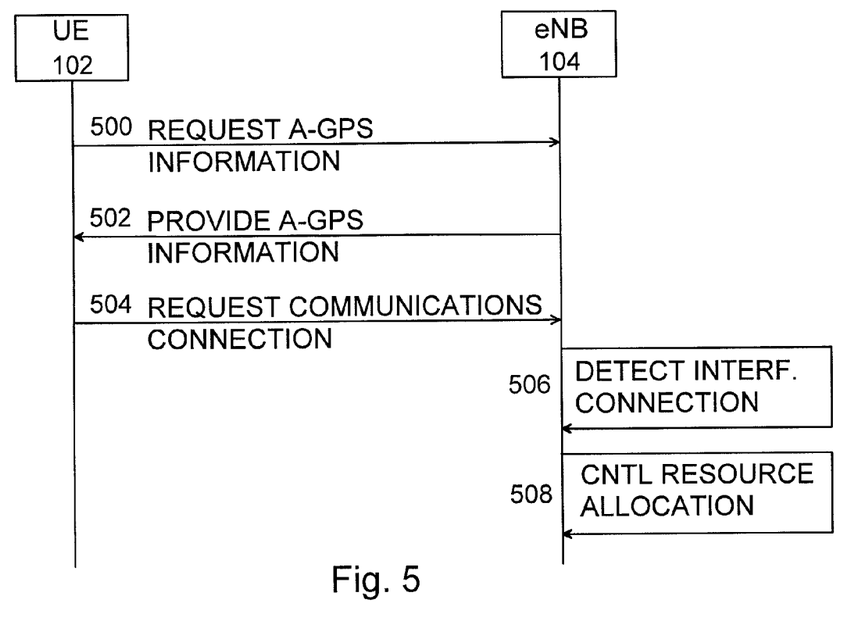
FIG. 5 shows a messaging diagram illustrating an exemplary event according to an embodiment of the invention.

FIG. 5 shows a messaging diagram illustrating an exemplary event according to an embodiment. In 500, the base station 104 receives a request for A-GPS information from the mobile terminal 102. In 502, the base station provides the A-GPS information to the mobile terminal. In 504, the base station receives a request for communications connection from the mobile terminal. In 506, the base station detects that the requested communications connection is such that it may cause interference to a received GPS signal in the mobile terminal. In 508, the base station prevents interference to the received GPS signal due to the requested communications connection by controlling uplink resource allocation of the mobile terminal. The base station may prevent interference to the GPS signal by scheduling uplink transmission bandwidth for the mobile terminal such that the reception of the global satellite navigation system signal is ensured.

Figure 6:
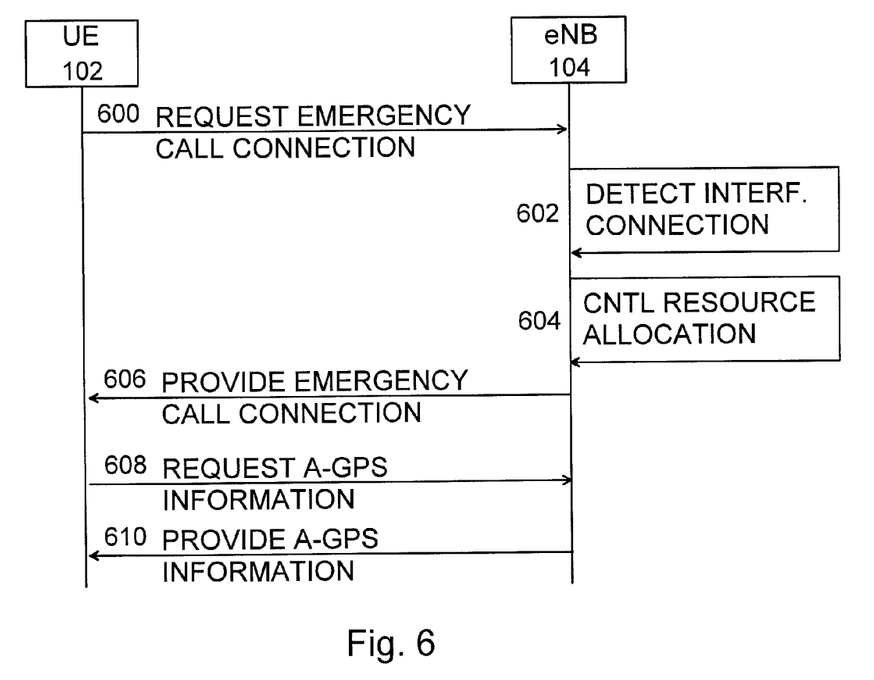
FIG. 6 shows a messaging diagram illustrating another exemplary event according to an embodiment of the invention.

FIG. 6 shows a messaging diagram illustrating another exemplary event according to an embodiment. In 600, the base station 104 receives an emergency call connection request from the mobile terminal 102. In 602, the base station detects that a location fix of the mobile terminal is required in connection with an emergency call and that the emergency call may interfere with the received GPS signal. Thus, in 604, the base station prevents interference to the received GPS signal due to the established emergency call connection by controlling uplink resource allocation of the mobile terminal. In 606, the emergency call connection is provided. In 608, the mobile terminal requests A-GPS information, and in 610, A-GPS information is provided for the mobile terminal.

An emergency call is usually established as soon as possible even before knowing the location of the mobile terminal. Thus, it is possible that the location shall be obtained while the emergency call connection is proceeding. However, in an embodiment, the base station knows on the basis of the nature of the requested connection that reception of the GPS signal may be required during that connection. Therefore, the base station may prevent the emergency call from interfering with the reception of the GPS signal by allocating mobile terminal uplink resources such that any interference between the emergency call and the GPS signal reception can be avoided.

The steps/points, signaling messages and related functions de-scribed above in FIGS. 5 and 6 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The server operations illustrate a procedure that may be implemented in one or more physical or logical entities. The signaling messages are only exemplary and may even comprise several separate messages for transmitting the same information. In addition, the messages may also contain other information.

Figure 7:
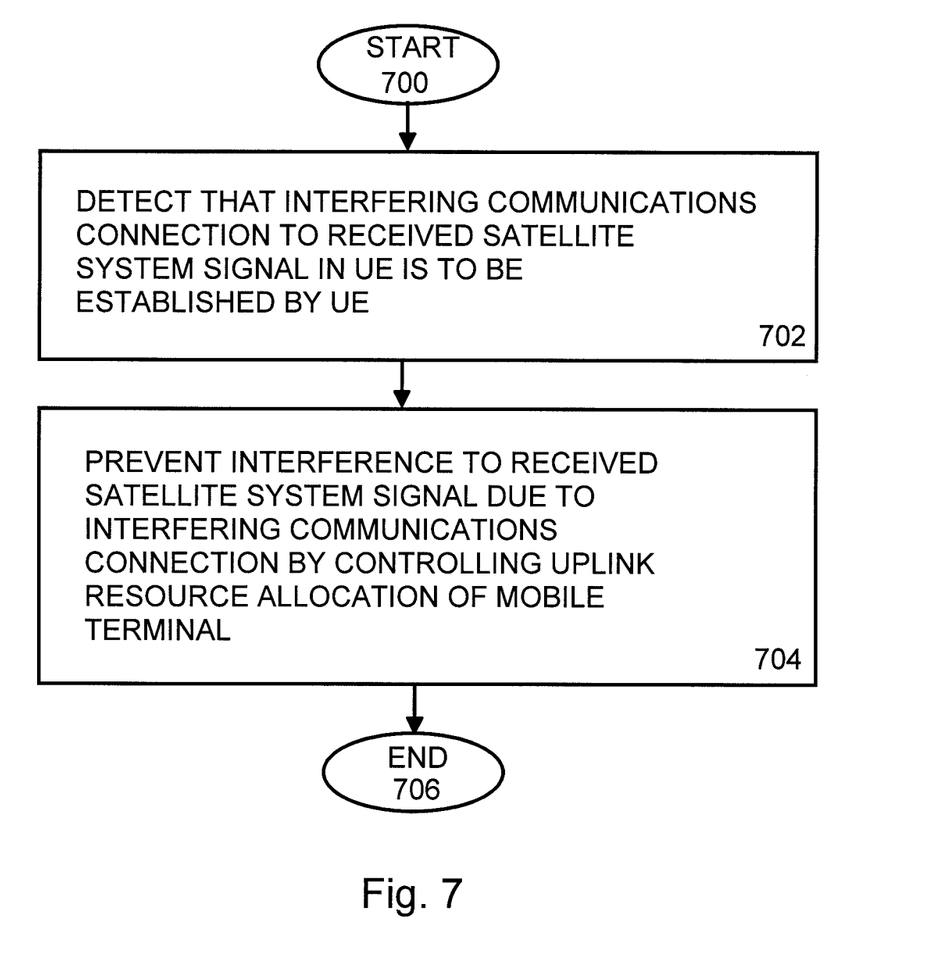
FIG. 7 illustrates an example of a method according to an embodiment of the invention.

FIG. 7 illustrates an example of a method according to an embodiment. The method starts in 700. In 702, an apparatus, e.g. in a network element, detects that an interfering communications connection to a received satellite system signal in the mobile terminal is to be established. In 704, interference to the received satellite system signal due to interfering communications connection is prevented by controlling uplink resource allocation of the mobile terminal. The method ends in 706.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
  a detector configured to detect that an interfering communications connection to a received satellite system signal in a mobile terminal is to be established by the mobile terminal; and
  a processor configured to prevent interference to the received satellite system signal due to the interfering communications connection by controlling uplink resource allocation of the mobile terminal based on the detection,
  wherein the processor is further configured to schedule an uplink transmission bandwidth for the mobile terminal to a lower frequency part or a higher frequency part based on the second harmonic center frequency of the uplink transmission bandwidth in order to prevent interference to the satellite system signal due to the interfering communications connection.

2. The apparatus according to claim 1, wherein the detector is further configured to detect that the reception of the satellite system signal is established by the mobile terminal based on a global satellite navigation system information request received from the mobile terminal.

3. The apparatus according to claim 1, wherein the detector is further configured to detect that the interfering communications connection to the received satellite system signal is to be established by the mobile terminal during the reception of the satellite system signal in the mobile terminal.

4. The apparatus according to claim 1, further comprising a communicator configured to receive a connection request from the mobile terminal; and,
wherein the detector is further configured to detect that the connection requested by the mobile terminal is such that simultaneous reception of the satellite system signal is expected during the established connection.

5. The apparatus according to claim 4, wherein the requested connection is an emergency call connection.

6. The apparatus according to claim 4, wherein the detector is further configured to detect that the connection requested by the mobile terminal is an interfering communications connection to the received satellite system signal.

7. The apparatus according to claim 1, wherein the processor is further configured to control uplink transmission bandwidth for the mobile terminal in order to prevent interference to the satellite system signal due to the interfering communications connection.

8. The apparatus according to claim 1, wherein the processor is further configured to schedule uplink transmission bandwidth for the mobile terminal such that the reception of the satellite system signal is ensured in order to prevent interference to the satellite system signal due to the interfering communications connection.

9. The apparatus according to claim 1, wherein the processor is further configured to avoid scheduling the uplink transmission bandwidth for the mobile terminal to a higher frequency part or a lower frequency part of the uplink transmission bandwidth in order to prevent interference to the satellite system signal due to the interfering communications connection.

10. The apparatus according to claim 1, wherein the satellite system signal is a global positioning system signal configured to determine location of the mobile terminal.

11. The apparatus according to claim 1, wherein the apparatus is a network element.

12. A method comprising:
detecting, by an apparatus, that an interfering communications connection to a received satellite system signal in a mobile terminal is to be established by the mobile terminal; and
preventing, by the apparatus, interference to the received satellite system signal due to the interfering communications connection by controlling uplink resource allocation of the mobile terminal based on the detection,
wherein the preventing the interference comprises scheduling an uplink transmission bandwidth for the mobile terminal to a lower frequency part or a higher frequency part based on the second harmonic center frequency of the uplink transmission bandwidth.

13. The method according to claim 12, further comprising:
detecting that the reception of the satellite system signal is established by the mobile terminal based on a global satellite navigation system information request received from the mobile terminal.

14. The method according to claim 12, further comprising:
detecting that the interfering communications connection to the received satellite system signal is to be established by the mobile terminal during the reception of the satellite system signal in the mobile terminal.

15. The method according to claim 12, further comprising:
receiving a connection request from the mobile terminal; and
detecting that the connection requested by the mobile terminal is such that simultaneous reception of the satellite system signal is expected during the established connection.

16. The method according to claim 15, wherein the requested connection is an emergency call connection.

17. A system comprising:
at least one network element; and
at least one mobile terminal configured to communicate with the at least one network element,
wherein said at least one network element is configured to detect that an interfering communications connection to a received satellite system signal in the mobile terminal is to be established by the mobile terminal;
wherein the at least one network element is further configured to prevent interference to the received satellite system signal due to the interfering communications connection by controlling uplink resource allocation of the mobile terminal based on the detection; and
wherein the at least one network element is further configured to schedule an uplink transmission bandwidth for the mobile terminal to a lower frequency part or a higher frequency part based on the second harmonic center frequency of the uplink transmission bandwidth.

18. A non-transitory computer readable medium embodying a computer program, the computer program configured to cause a processor to perform:
detecting that an interfering communications connection to a received satellite system signal in a mobile terminal is to be established by the mobile terminal; and
preventing interference to the received satellite system signal due to the interfering communications connection by controlling uplink resource allocation of the mobile terminal based on the detection,
wherein the preventing interference comprising scheduling an uplink transmission bandwidth for the mobile terminal to a lower frequency part or a higher frequency part based on the second harmonic center frequency of the uplink transmission bandwidth.

19. The non-transitory computer readable medium according to claim 18, wherein the computer readable medium comprises at least one of the following media:
a computer readable medium, a program storage medium, a record medium, a computer readable memory, a computer readable software distribution package, a computer readable signal, a computer readable telecommunication signal, and a computer readable compressed software package.

20. An apparatus comprising:
detection means for detecting that an interfering communications connection to a received satellite system signal in a mobile terminal is to be established by the mobile terminal; and
processing means for preventing interference to the received satellite system signal due to the interfering communications connection by controlling uplink resource allocation of the mobile terminal based on the detection,
wherein the processing means schedules an uplink transmission bandwidth for the mobile terminal to a lower frequency part or a higher frequency part based on the second harmonic center frequency of the uplink transmission bandwidth.

* * * * *